United States Patent [19]
Paoletti

[11] Patent Number: 5,892,514
[45] Date of Patent: Apr. 6, 1999

[54] MULTI-BLOCK THREE DIMENSIONAL GRID

[75] Inventor: Stefano Paoletti, Smithtown, N.Y.

[73] Assignee: International Business Machines Corporation, Armonk, N.Y.

[21] Appl. No.: 857,320

[22] Filed: May 16, 1997

[30] Foreign Application Priority Data

May 18, 1996 [GB] United Kingdom .................... 9610476

[51] Int. Cl.$^6$ .................................................. G06T 17/00

[52] U.S. Cl. ........................................... 345/419; 345/420

[58] Field of Search ..................................... 345/418, 419, 345/420, 423, 424, 429

[56] References Cited

U.S. PATENT DOCUMENTS

| | | | |
|---|---|---|---|
| 5,497,452 | 3/1996 | Shimizu et al. | 345/420 |
| 5,649,079 | 7/1997 | Holmes | 345/420 |
| 5,739,882 | 4/1998 | Paradine | 345/419 |
| 5,745,665 | 4/1998 | Pasco | 345/419 |
| 5,764,232 | 6/1998 | Oouchi | 345/419 |

*Primary Examiner*—Cliff N. Vo
*Attorney, Agent, or Firm*—Randy W. Lacasse; David J. Kappos

[57] ABSTRACT

A computer graphics system and method for automatically defining a multi-block grid in a three dimensional space region which has a plurality of finite 4-sided surfaces arranged so that the space region is divided into a plurality of substantially hexahedral adjacent blocks.

7 Claims, 6 Drawing Sheets

MULTI-BLOCK THREE DIMENSIONAL GRID

TECHNICAL FIELD

The present invention relates to computer graphic systems and particularly to a method and system for automatic grid generation therein.

BACKGROUND OF THE INVENTION

In the field of the computer graphics, three-dimensional space representation is an increasingly felt problem. The multi-block approach for grid generation assumes that the computational domain is divided into a finite number of subdomains, called blocks, each one topologically equivalent to a cube, i.e. it is formed of six faces, twelve edges and eight corners. These blocks are also defined as hexahedral blocks. The computational grid is therefore created in every block obtaining a final multi-block grid which covers the whole computational domain.

It is known to handle such three-dimensional space representation with CAD systems such as CATIA of Dassault Systemes. With these systems is possible to ideally divide the three-dimensional space into a number of hexahedral blocks by defining the surfaces which delimite such blocks. What is obtained is a plurality of four-sided finite surfaces defined by three-dimensional Cartesian coordinates.

The next step is to define the topology of the three-dimensional domain, i.e. to create a correlation among the surfaces in order to make the system recognize which surfaces form an hexahedral block.

None of the known systems is able to do this topology definition and a user should define each block by manually indicating the six surfaces "belonging" to that block. This is a very time consuming process which heavily affect the performance of the system.

SUMMARY OF THE INVENTION

The present invention has the object to overcome the above drawbacks.

According to the invention we provide in a computer graphics system which digitally represents a three dimensional space region, the three dimensional space region having a plurality of predefined 4-edged surfaces, the plurality of surfaces being arranged so that each one of the plurality of surfaces has at least one edge in common with at least another one of the plurality of surfaces and so that the plurality of surfaces divides the three dimensional space region into a plurality of substantially hexahedral adjacent blocks, a method for identifying at least a first set of six of the plurality of surfaces, which defines one of the plurality of blocks, the first set of six surfaces comprising a base surface, an opposite surface and four lateral surfaces, the method comprising the steps of:

designating one of the plurality of surfaces as the base surface;
determining a second set of surfaces, the second set of surfaces comprising all and only the surfaces of the plurality of surfaces having one edge in common with the base surface, excluding the base surface itself;
determining a third set of surfaces, the third set of surfaces comprising all and only the surfaces of the plurality of surfaces:
having one edge in common with at least one of the surfaces of the second set of surfaces,
not belonging to the second set of surfaces,
not coincident with the base surface;
determining at least an opposite surface belonging to the third set so that for each opposite surface:
four lateral surfaces belonging to the second set have one edge in common with the opposite surface;
the sum of the different edges of the base surface, the opposite surface and the four lateral surfaces is equal to 12.

Furthermore, according to the present invention, we provide a computer graphics system for digitally representing a three dimensional space region, the three dimensional space region having a plurality of predefined 4-edged surfaces, the plurality of surfaces being arranged so that each one of the plurality of surfaces has at least one edge in common with at least another one of the plurality of surfaces and so that the plurality of surfaces divides the three dimensional space region into a plurality of substantially hexahedral adjacent blocks, the system comprising:

means for designating one of the plurality of surfaces as the base surface;
means for determining a first set of surfaces, the first set of surfaces comprising all and only the surfaces of the plurality of surfaces having one edge in common with the base surface, excluding the base surface itself;
means for determining a second set of surfaces, the second set of surfaces comprising all and only the surfaces of the plurality of surfaces:
having one edge in common with at least one of the surfaces of the first set of surfaces,
not belonging to the first set of surfaces,
not coincident with the base surface;
means for determining at least an opposite surface belonging to the second set so that for each opposite surface:
four lateral surfaces belonging to the first set exist which have one edge in common with the opposite surface;
the sum of the different edges of the base surface, the opposite surface and the four lateral surfaces is equal to 12;
means for defining, for each opposite surface, said opposite surface, said base surface and said four lateral surfaces as delimiting one of said plurality of adjacent substantially hexahedral blocks.

BRIEF DESCRIPTION OF THE DRAWINGS

Various embodiments of the invention will now be described in detail by way of examples, with reference to accompanying figures, where.

DETAILED DESCRIPTION OF THE PREFERRED EMBODIMENT

As mentioned above, when defining blocks in a CAD environment, the four sided surfaces delimiting the blocks must be created. In a three-dimensional space, a surface can be expressed in mathematical form as:

x=x(u,v);
y=y(u,v);
z=z(u,v);

where 0<u<1 and 0<v<1 (in the normalized form) the four edges can be defined as:

| edge 1: | x = x(0,v), |
| | y = y(0,v), |
| | z = z(0,v); |
| edge 2: | x = x(1,v), |
| | y = y(1,v), |
| | z = z(1,v); |
| edge 3: | x = x(u,0), |
| | y = y(u,0), |
| | z = z(u,0); |
| edge 4: | x = x(u,1), |
| | y = y(u,1), |
| | z = z(u,1). |

When creating surfaces which have a common edge a CAD system usually cannot ensure that the common edge have exactly the same spatial coordinates when considered as belonging to one surface and when considered as belonging to the other surface. Sometimes it happens that the same edge in the real three-dimensional domain is represented with two slightly different equations when considering two different surfaces. For this reason before starting the searching of the blocks it's necessary to check these possible mismatches and to "repair" these "cracks".

Figure 1:
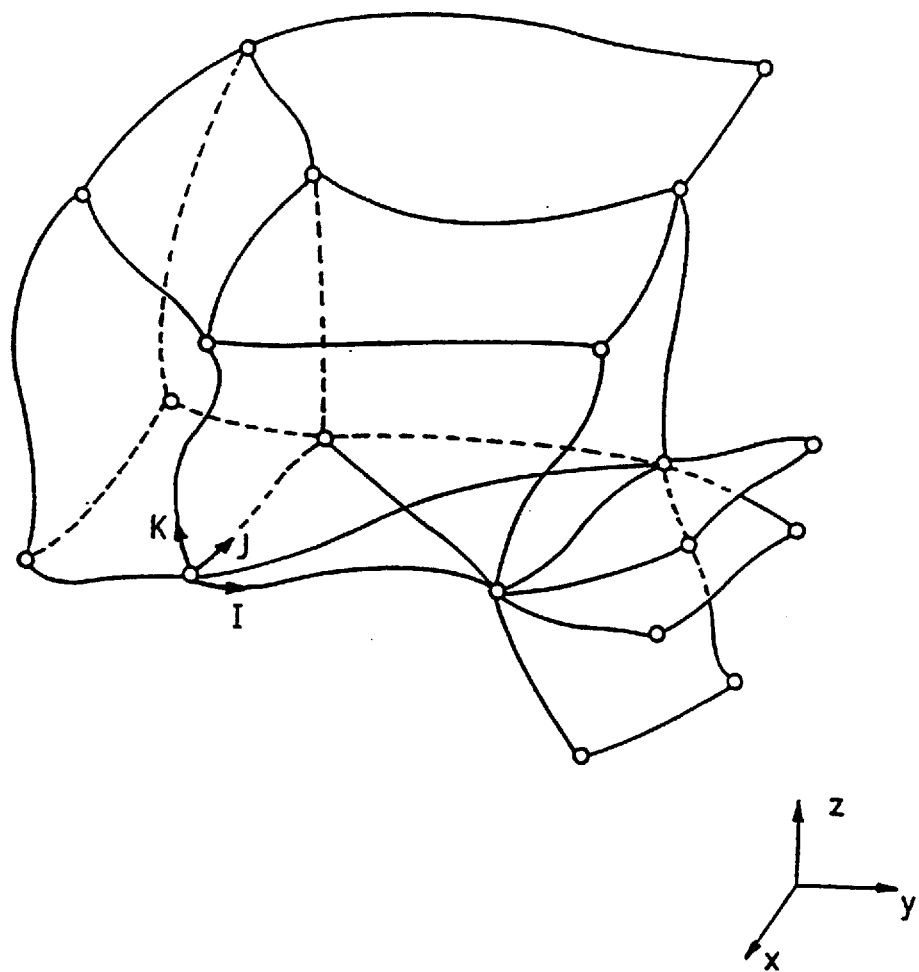
FIG. 1 is a schematical representation of a portion of the three-dimensional domain.
Figure 2:
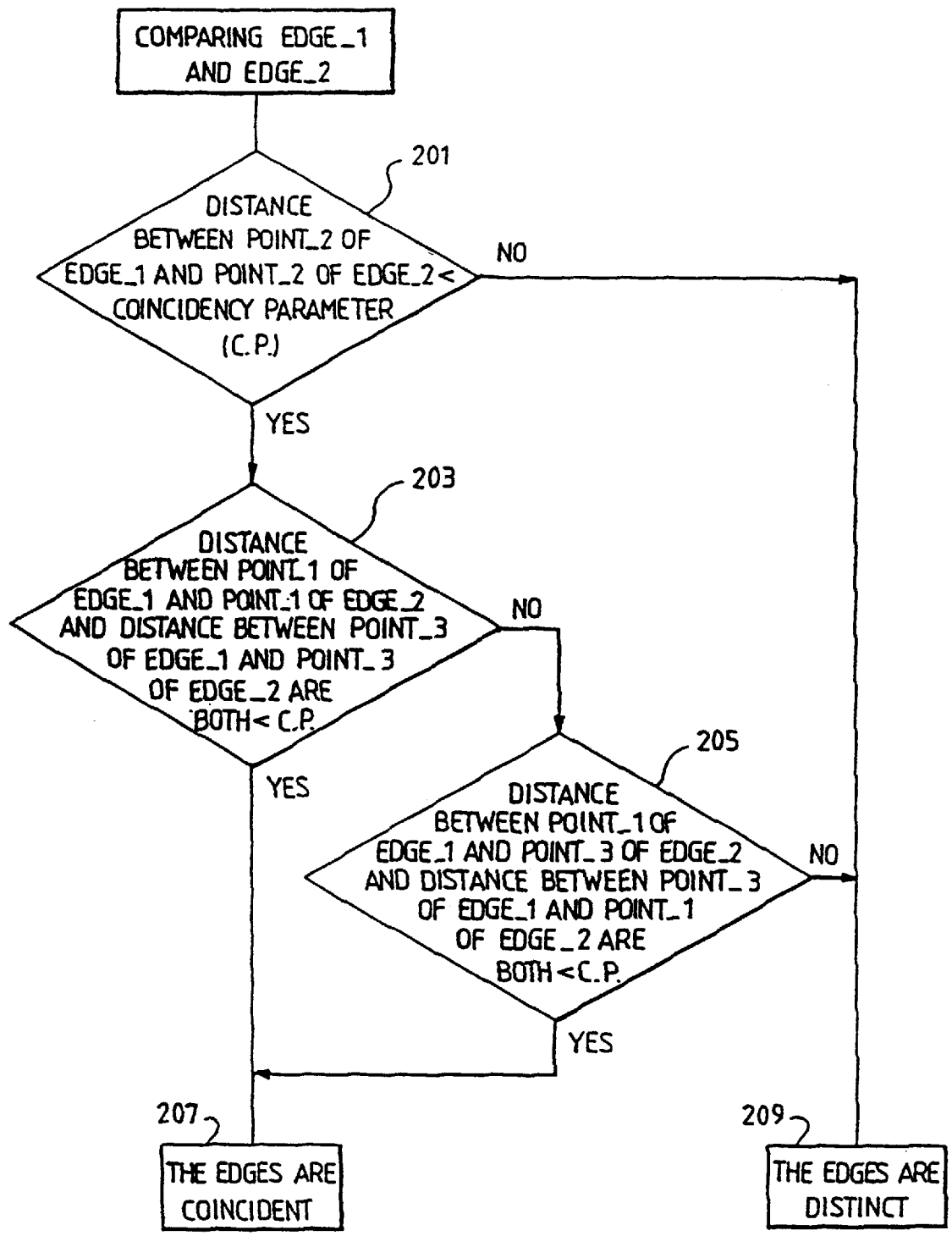
FIG. 2 shows schematically the method of determining whether two edges are coincident or not, according to a preferred embodiment of the present invention.
Figure 3:
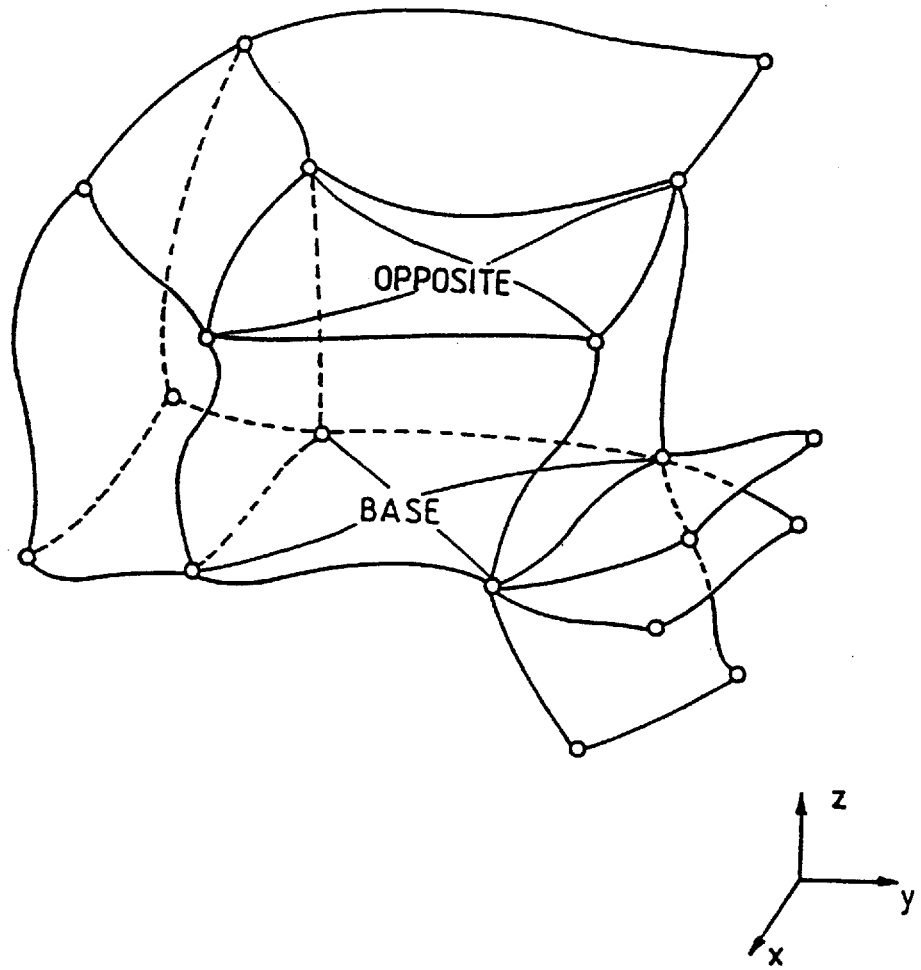
FIG. 3 shows an example of a hexahedral block in a three-dimensional space region.

According to a preferred embodiment of the present invention the check whether a pair of edges are referring to the same logical edge is done with the following method. For each surface three control points are evaluated:

the first point is taken at normalized arc length equal to 0;
the second point is taken at middle length of the edge;
the third point is taken at normalized arc length equal to 1;

Each edge is then compared with all the others to check whether the distance between control points is less than a predetermined threshold, which we call the Coincidency Parameter. Only that group of edges which satisfies this requirement is considered to be coincident and are marked for future processing (e.g. by giving a unique edge number). As shown in FIG. 2 the check is performed by first comparing the coordinates of points 2 (step 201) to determine whether the distance is within the tolerance (i.e. is less than the Coincidency Parameter). If this check is passed then the coordinates of point 1 and point 3 of one edge are compared with coordinates of point 1 and point 3 of the other edge (step 203). If this condition is satisfied then the two edges are considered coincident; otherwise the coordinates of point 1 and point 3 of one edge are compared with coordinates of point 3 and point 1 of the other edge (step 205). Again, if this condition is satisfied then the two edges are considered coincident; otherwise they are considered independent edges.

The Coincidency Parameter can be determined in different ways. In a preferred embodiment it is related to the dimension of the edges: for each edge the length of the broken line formed by the two segments between the first and the second and between the second and the third points mentioned above is evaluated. Then, a fraction of the smallest of such lengths is defined as the Coincidency Parameter. According to a preferred embodiment the fraction has been chosen to be ¼, but other fractions could be used.

According to a preferred embodiment to each group of coincident edges a different number is assigned, so that at the end of this "check and repair" step every logical edge will have a unique number.

Now the block definition process can be started. Let's define opposite surface to a base one, a surface for which four other surfaces exist which connect the edges of the base surface to the edges of the opposite surface. For an hexahedral block to be identified it is necessary that a surface exists for which an opposite surface and four lateral surfaces exist in the plurality of surfaces of the three-dimensional domain. Another condition to be satisfied is that each of the four lateral surfaces has two edges in common with two of the other three lateral surfaces. This means that the hexahedral block formed by the six surfaces is "closed" (i.e. no crack exists between two lateral consecutive surfaces). A simple way to check this condition is to verify whether the number of the different edges of the hexahedral block (i.e. of the six surfaces defining it) is twelve.

Figure 4:
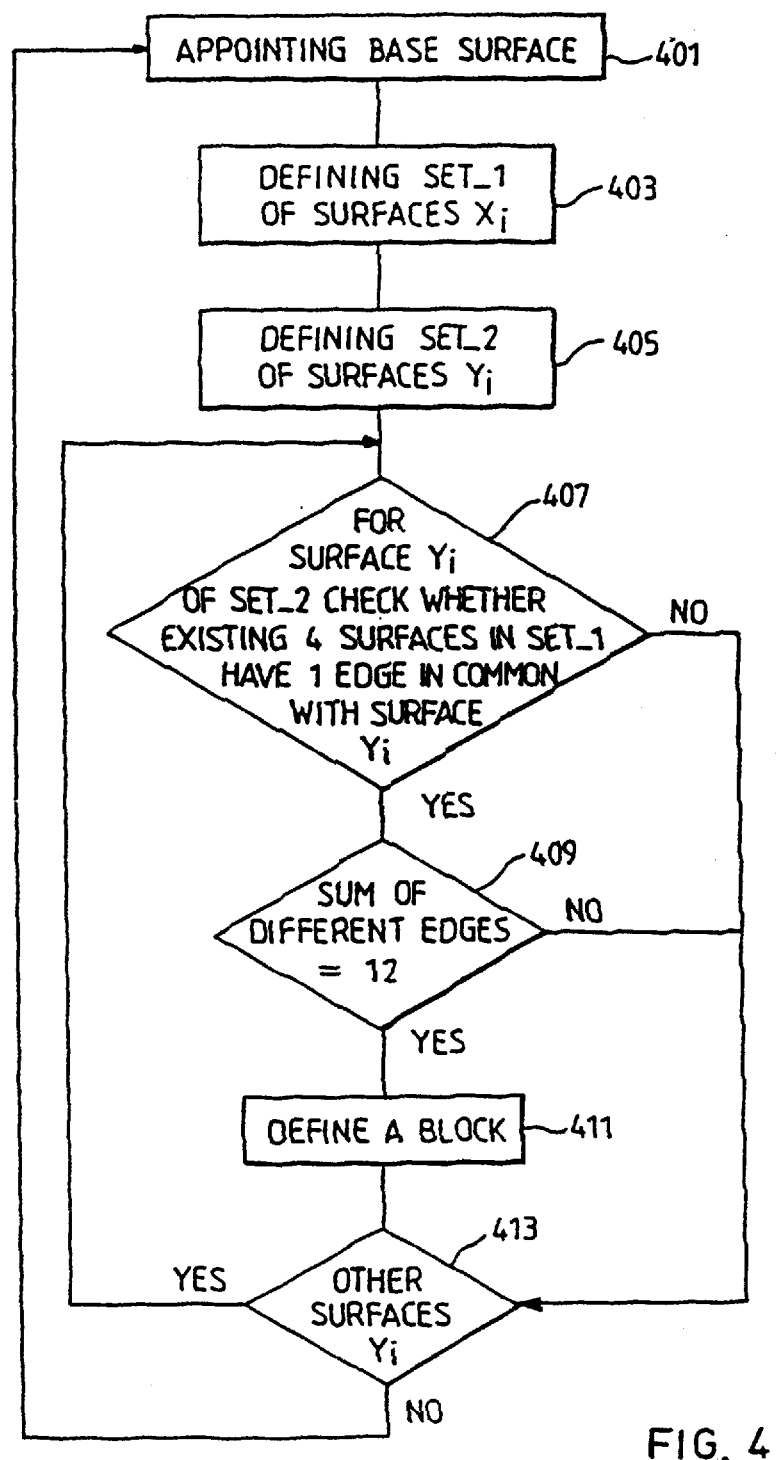
FIG. 4 shows schematically the method of a preferred embodiment of the present invention.
Figure 5:
FIG. 5 is a schematical representation of the surfaces belonging to SET_1 according to a preferred embodiment of the present invention.
Figure 5:
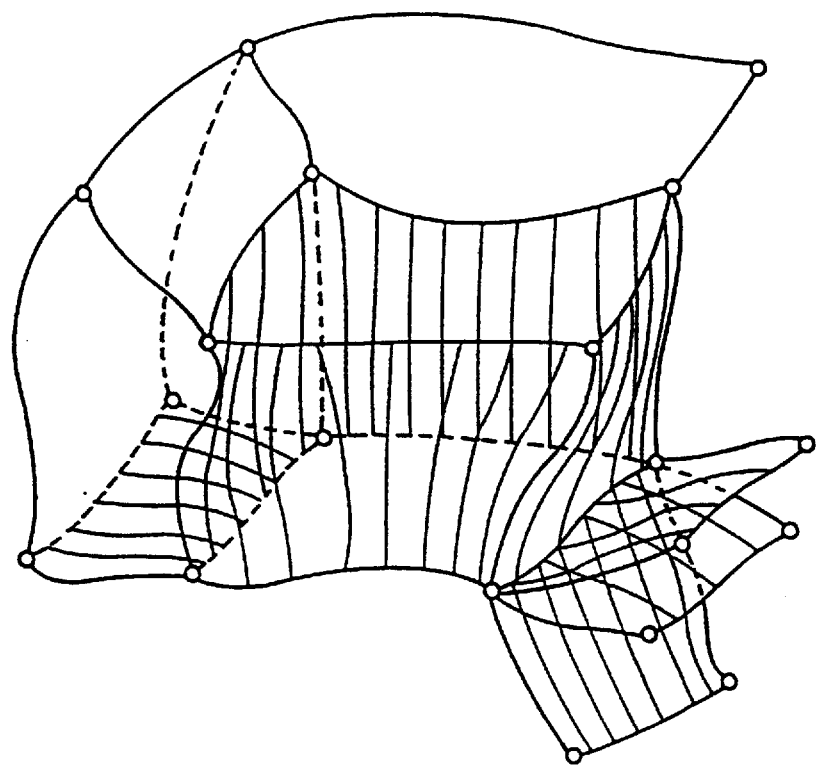
Figure 5:
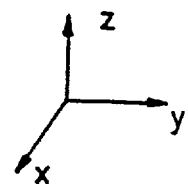

FIG. 4 shows the process steps for determining hexahedral blocks by identifying a set of six surfaces as explained above, starting from a base surface: in order to define all the blocks of the three-dimensional domain these steps should be repeated for all the surfaces of the domain. Step 401 appoints one of the surfaces of the domain as the base surface. Then a first set (SET_1) of surfaces is defined which comprises all and only the surfaces having one edge in common with the base surface (step 403), as shown in FIG. 5.

Then a second set (SET_2) of surfaces is defined (step 405) which comprises all and only the surfaces satisfying the following conditions:

having one edge in common with at least one of the surfaces of SET_1;
not belonging to SET_1; and
not coincident with the base surface.

Figure 6:
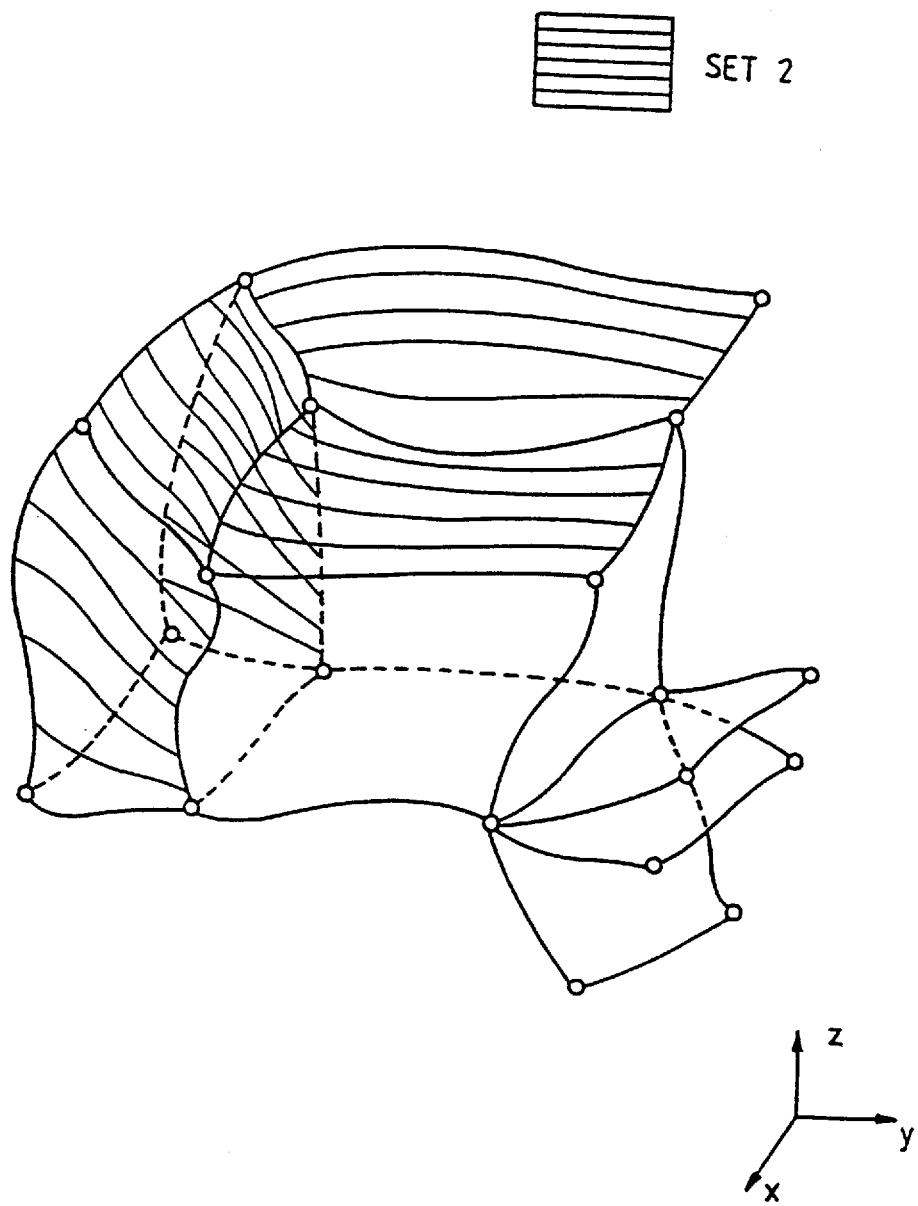
FIG. 6 is a schematical representation of the surfaces belonging to SET_2 according to a preferred embodiment of the present invention.

This SET_2 is represented in FIG. 6.

It is evident that, if the base surface is part of a hexahedral block, SET_1 shall contain its four lateral surfaces and SET_2 shall contain at least one opposite surface. One base surface could belong to two different blocks. In such case SET_1 shall contain two series of four lateral surfaces and SET_2 two opposite surfaces.

Step 407 checks whether for each surface belonging to SET_2 four surfaces exist in SET_1 having one edge in common with such surface. If this is the case then a check is made whether the sum of all different edges of the six surfaces (the base, the opposite and the four lateral) is equal to 12 (step 409). If all these conditions are satisfied a block is defined by this set of six surfaces.

Steps 407 and 409 are repeated for all the surfaces in SET_2 or until two blocks are defined for a base surface.

A possible variation to the above method steps could be include the check made by step 407 into the definition of SET_2, modifying the conditions in step 405. The first and the second conditions should be substituted by the following one:

having each edge in common with a surface of SET_1.

I claim:

1. In a computer graphics system which digitally represents a three dimensional space region, the three dimensional space region having a plurality of predefined 4-edged surfaces, the plurality of surfaces being arranged so that each one of the plurality of surfaces has at least one edge in common with at least another one of the plurality of surfaces and so that the plurality of surfaces divides the three dimensional space region into a plurality of substantially hexahedral adjacent blocks, a method for identifying at least a first set of six of the plurality of surfaces, which defines one of the plurality of blocks, the first set of six surfaces comprising a base surface, an opposite surface and four lateral surfaces, the method comprising the steps of:

designating one of the plurality of surfaces as the base surface;

determining a second set of surfaces, the second set of surfaces comprising all and only the surfaces of the plurality of surfaces having one edge in common with the base surface, excluding the base surface itself;

determining a third set of surfaces, the third set of surfaces comprising all and only the surfaces of the plurality of surfaces:

having one edge in common with at least one of the surfaces of the second set of surfaces, not belonging to the second set of surfaces, not coincident with the base surface;

determining at least an opposite surface belonging to the third set so that for each opposite surface:

four lateral surfaces belonging to the second set have one edge in common with the opposite surface;

the sum of the different edges of the base surface, the opposite surface and the four lateral surfaces is equal to 12.

2. The method of claim 1 iteratively used for defining the plurality of substantially hexahedral adjacent blocks.

3. A three dimensional grid generation method using the method of claim 2.

4. The method of claim 1 wherein the three dimensional space region is a computational domain.

5. The method of claim 1 wherein said third set of surfaces comprises all and only the surfaces of the plurality of surfaces:

having each edge in common with one of the surfaces of the second set of surfaces; and not coincident with the base surface.

6. A computer graphics system for digitally representing a three dimensional space region, the three dimensional space region having a plurality of predefined 4-edged surfaces, the plurality of surfaces being arranged so that each one of the plurality of surfaces has at least one edge in common with at least another one of the plurality of surfaces and so that the plurality of surfaces divides the three dimensional space region into a plurality of substantially hexahedral adjacent blocks, the system comprising:

means for designating one of the plurality of surfaces as the base surface;

means for determining a first set of surfaces, the first set of surfaces comprising all and only the surfaces of the plurality of surfaces having one edge in common with the base surface, excluding the base surface itself;

means for determining a second set of surfaces, the second set of surfaces comprising all and only the surfaces of the plurality of surfaces:

having one edge in common with at least one of the surfaces of the first set of surfaces, not belonging to the first set of surfaces, not coincident with the base surface;

means for determining at least an opposite surface belonging to the second set so that for each opposite surface:

four lateral surfaces belonging to the first set exist which have one edge in common with the opposite surface;

the sum of the different edges of the base surface, the opposite surface and the four lateral surfaces is equal to 12;

means for defining, for each opposite surface, said opposite surface, said base surface and said four lateral surfaces as delimiting one of said plurality of adjacent substantially hexahedral blocks.

7. A three dimensional CAD system using the system of claim 6.

* * * * *

UNITED STATES PATENT AND TRADEMARK OFFICE
CERTIFICATE OF CORRECTION

PATENT NO. : 5,892,514
DATED : 4/6/1999
INVENTOR(S) : STEPHANO PAOLETTI

It is certified that error appears in the above-identified patent and that said Letters Patent is hereby corrected as shown below:

Column 1, line 23, after "systems" insert --it--.

Column 3, line 32, after "invention" inset --,--.

Column 3, line 45, after "FIG. 2" insert --,--.

Column 4, line 54, after "could" delete --be--.

Signed and Sealed this

Twenty-eighth Day of December, 1999

Attest:

Q. TODD DICKINSON

*Attesting Officer*  *Acting Commissioner of Patents and Trademarks*